(12) United States Patent
Bradley

(10) Patent No.: US 10,564,044 B2
(45) Date of Patent: Feb. 18, 2020

(54) THERMOMETER INCLUDING COLOR CHANGING ILLUMINATION PORTION

(71) Applicant: D-M-S Holdings, Inc., West Des Moines, IA (US)

(72) Inventor: Samuel Bradley, Mundelein, IL (US)

(73) Assignee: D-M-S Holdings, Inc., West Des Moines, IA (US)

( * ) Notice: Subject to any disclaimer, the term of this patent is extended or adjusted under 35 U.S.C. 154(b) by 199 days.

(21) Appl. No.: 15/562,728

(22) PCT Filed: Apr. 1, 2016

(86) PCT No.: PCT/US2016/025575
§ 371 (c)(1),
(2) Date: Sep. 28, 2017

(87) PCT Pub. No.: WO2016/161297
PCT Pub. Date: Oct. 6, 2016

(65) Prior Publication Data
US 2018/0080832 A1    Mar. 22, 2018

Related U.S. Application Data

(60) Provisional application No. 62/141,687, filed on Apr. 1, 2015.

(51) Int. Cl.
*G01K 1/02*     (2006.01)
*G01J 5/00*     (2006.01)
(Continued)

(52) U.S. Cl.
CPC .............. *G01K 1/02* (2013.01); *G01J 5/0011* (2013.01); *G01J 5/0025* (2013.01); *G01J 5/32* (2013.01);
(Continued)

(58) Field of Classification Search
CPC .......... G01K 1/02; G01K 1/06; G01K 13/002; G01K 13/004; G01J 5/0011; G01J 5/0025; G01J 5/027; G01J 5/32
See application file for complete search history.

(56) References Cited

U.S. PATENT DOCUMENTS 4,151,831 A * 5/1979 Lester ................ A61B 5/01
                                                368/10
5,017,018 A    5/1991 Iuchi
(Continued)

FOREIGN PATENT DOCUMENTS

WO    200133178 A1    5/2001
WO    2012082645 A2   6/2012

OTHER PUBLICATIONS

PCT International Search Report and Written Opinion dated Jun. 24, 2016 for Intl. App. No. PCT/US2016/025575, from which the instant application is based, 11 pgs.

*Primary Examiner* — Lisa M Caputo
*Assistant Examiner* — Philip L Cotey
(74) *Attorney, Agent, or Firm* — Fredrikson & Byron, P.A.

(57) ABSTRACT

Embodiments include a thermometer for measuring a temperature of a living being, including inside a cavity or on an external surface of the living being. The thermometer includes a temperature sensing probe coupled to the proximal end of the housing, a power source, light source, and processor. The light source can be configured to illuminate a portion of the housing near the temperature sensing probe. In some embodiments, the light source is configured to emit light in a plurality of colors. At least one of the plurality of colors may be indicative of a pre-measurement state. Some of the plurality of colors can be indicative of a specific temperature range. In some embodiments, the processor is (Continued)

operatively coupled to the power source, the temperature sensing probe, and the light source.

29 Claims, 9 Drawing Sheets

(51) Int. Cl.
    *G01J 5/32*     (2006.01)
    *G01K 1/06*     (2006.01)
    *G01K 13/00*     (2006.01)

(52) U.S. Cl.
    CPC .............. *G01K 1/06* (2013.01); *G01K 13/002* (2013.01); *G01K 13/004* (2013.01)

(56) References Cited

U.S. PATENT DOCUMENTS

| | | |
|---|---|---|
| 6,686,843 B2 | 2/2004 | Felkowitz |
| 7,350,973 B2 | 4/2008 | Craig et al. |
| 2001/0029324 A1 | 10/2001 | Walker et al. |
| 2005/0192512 A1 | 9/2005 | Butterworth |
| 2006/0062276 A1 | 3/2006 | Conforti |
| 2006/0291535 A1* | 12/2006 | Craig ................... G01K 1/06 374/208 |
| 2007/0071066 A1 | 3/2007 | Weng et al. |
| 2007/0160112 A1 | 7/2007 | Nanda |
| 2008/0080593 A1* | 4/2008 | Lane ................. G01K 13/002 374/208 |
| 2011/0043368 A1* | 2/2011 | Lu .......................... G01K 1/02 340/586 |
| 2011/0199203 A1* | 8/2011 | Hsu ........................ G01K 1/02 340/449 |
| 2012/0087391 A1 | 4/2012 | Chen |
| 2012/0150482 A1 | 6/2012 | Yildizyan |
| 2014/0003462 A1* | 1/2014 | Roth ................... G01K 1/028 374/121 |
| 2014/0064328 A1* | 3/2014 | Roth ................... G01J 5/025 374/130 |
| 2015/0351637 A1* | 12/2015 | Ruppersberg ...... A61B 1/00009 600/474 |

* cited by examiner

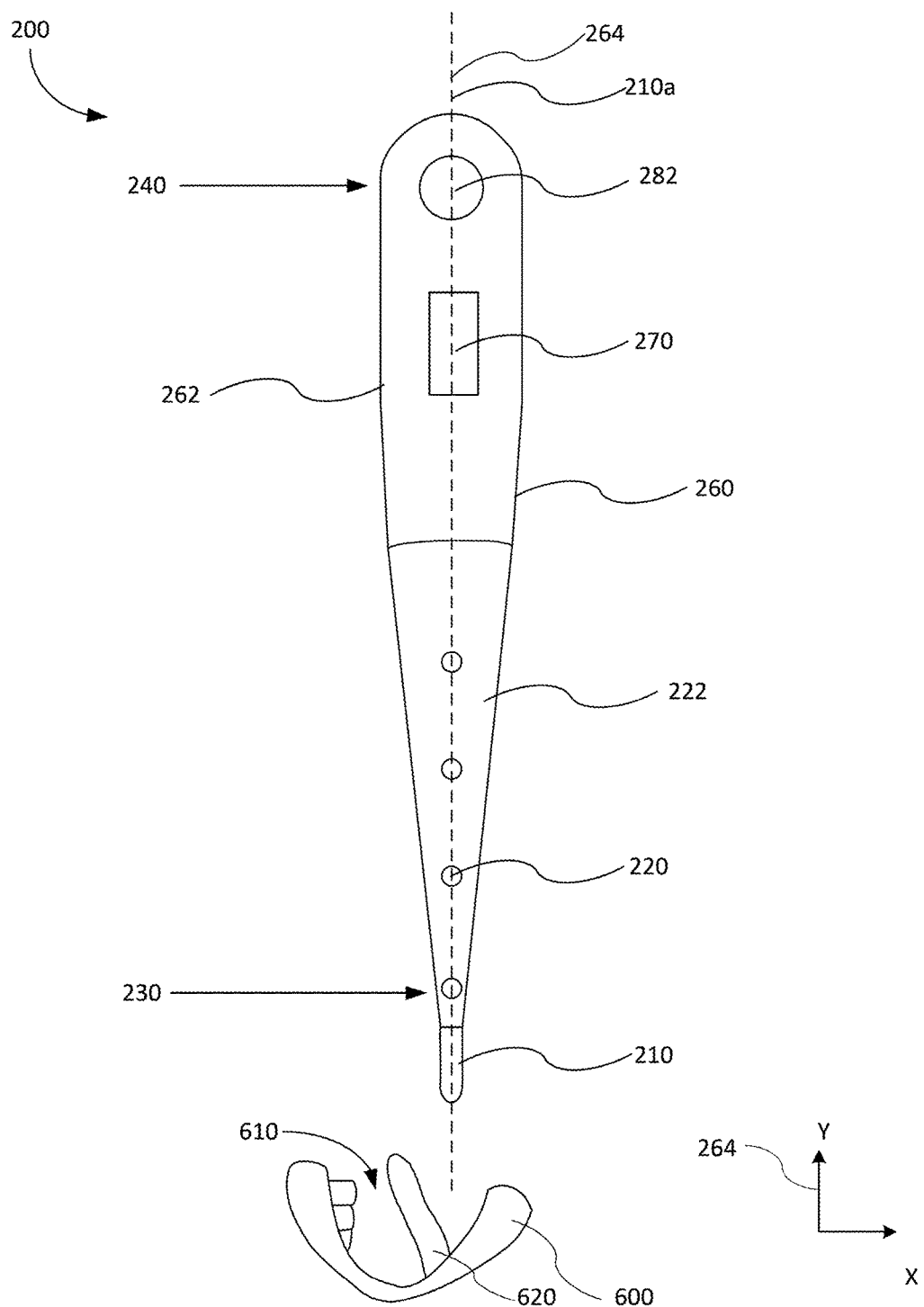

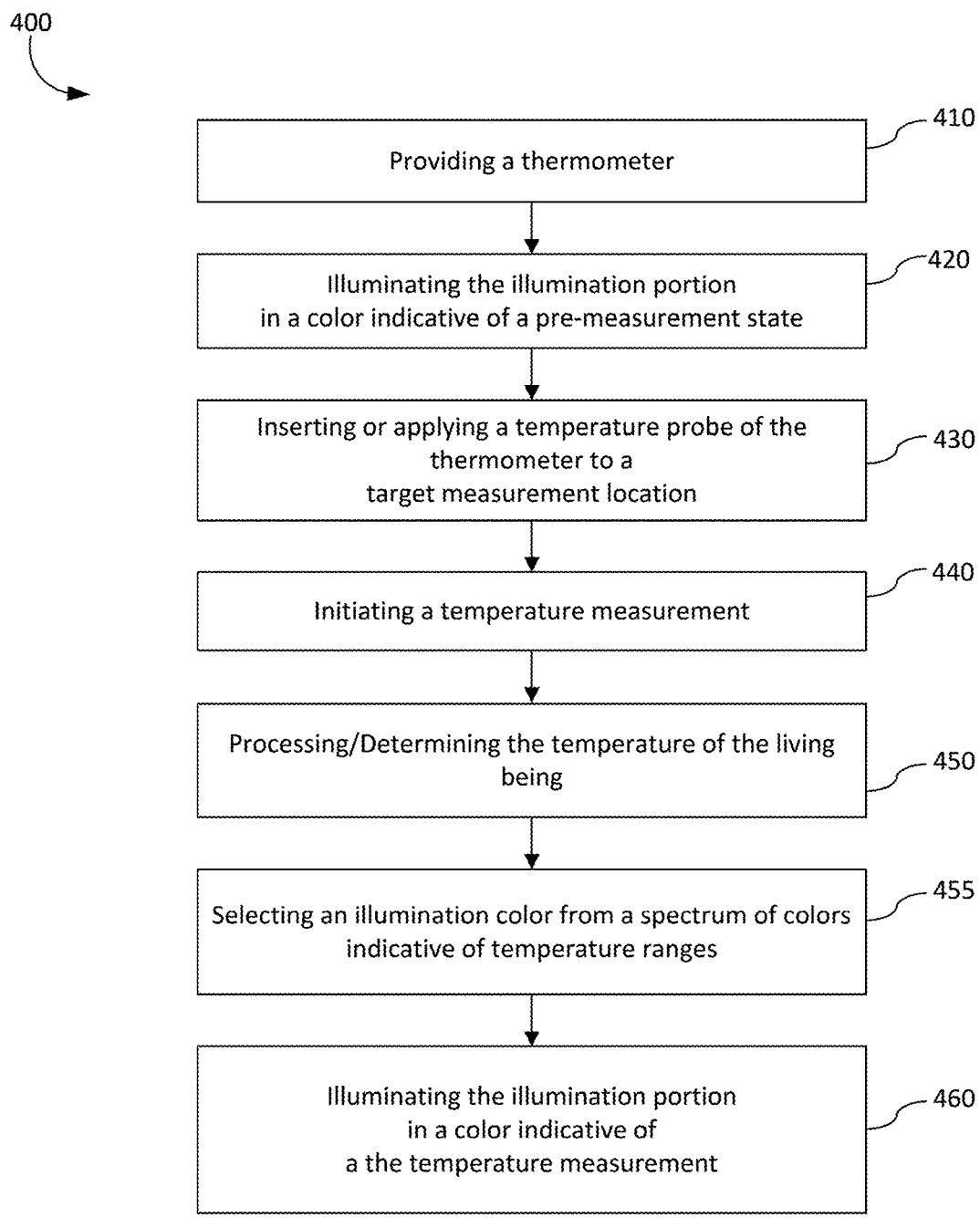

THERMOMETER INCLUDING COLOR CHANGING ILLUMINATION PORTION

RELATED APPLICATIONS

This application is a 35 U.S.C. 371 national stage filing from International Application No. PCT/US2016/025575, filed Apr. 1, 2016, which claims priority to U.S. Provisional Patent Application No. 62/141,687, filed Apr. 1, 2015, the teachings of which are incorporated herein by reference.

PRIORITY

This application claims priority to U.S. Provisional Patent Application No. 62/141,687 filed Apr. 1, 2015, which is entitled "THERMOMETER INCLUDING COLOR CHANGING ILLUMINATION PORTION" and is incorporated herein by reference in its entirety.

TECHNICAL FIELD

This disclosure relates to a thermometer for measuring a temperature of a living being at a target measurement location of the living being.

BACKGROUND

Technological advances have led to the development of new types of thermometers, including handheld electronic thermometers. Electronic thermometers can target different areas of the body for temperature measurement, including cavities such as the ears or mouth, or external areas such as the forehead. Some such thermometers use infrared technology to measure temperature. These thermometers can provide a relatively simple and non-invasive method for measuring temperature.

SUMMARY

Certain embodiments include a thermometer and a method for measuring a temperature of a living being, including inside a cavity or on an external surface of the living being. The thermometer includes a temperature sensing probe coupled on the proximal end of the housing. The thermometer also includes a power source, light source, and processor. Simplicity and accuracy of use may be improved by various methods, including providing targeted illumination, various colors indicative of temperature ranges, and other methods.

The light source can be configured to illuminate a portion of the housing near the temperature sensing probe. In some aspects, the thermometer measures temperature at a target location of the living being. In this case, the illumination portion of the housing faces towards and illuminates the target measurement location on the living being. In some aspects, the thermometer measures temperature at an openable and closable cavity of the living being. In this case, during a temperature measurement when the housing is placed in the cavity, the cavity is at least partially illuminated by the illumination portion of the housing. The cavity is illuminated both when the cavity is open and when the cavity is closed around the housing during the temperature measurement.

The light source can be configured to emit light in a plurality of colors. In some embodiments, at least one of the plurality of colors is indicative of a pre-measurement state. Some of the pluralities of colors may be indicative of a specific temperature range. The processor can be operatively coupled to the power source, the temperature sensing probe, and the light source.

The processor may be configured to determine the temperature of the living being based on information received from the temperature sensing probe. In some embodiments, the processor is configured to illuminate the light source in one of the plurality of colors based on the information from the temperature sensing probe.

In certain embodiments, the illumination portion of the housing comprises one or more light emitting diodes embedded in silicone. The illumination portion may include a sealing element. The sealing element may comprise silicone.

Certain embodiments position the light source to face and illuminate a cavity or external surface of the living being during a temperature measurement. The cavity or the external surface of the living being may be an ear, forehead, or oral or rectal cavity. The light source may be positioned and oriented to illuminate the living being both the inside and outside a cavity when held stationary during a temperature measurement.

BRIEF DESCRIPTION OF DRAWINGS

FIG. 1b is a close-up front view of an embodiment of a probe area of the thermometer embodiment shown in FIG. 1a.

FIG. 1d is a close-up cross section of another embodiment of the probe area of the thermometer shown in FIG. 1a.

FIG. 2a is a front view of an embodiment of a thermometer in accordance with the present disclosure proximate a mouth of a living being.

FIG. 4 is a flow chart of an embodiment of a method for measuring a temperature of a living being in accordance with the present disclosure.

DETAILED DESCRIPTION

Figure 1A:
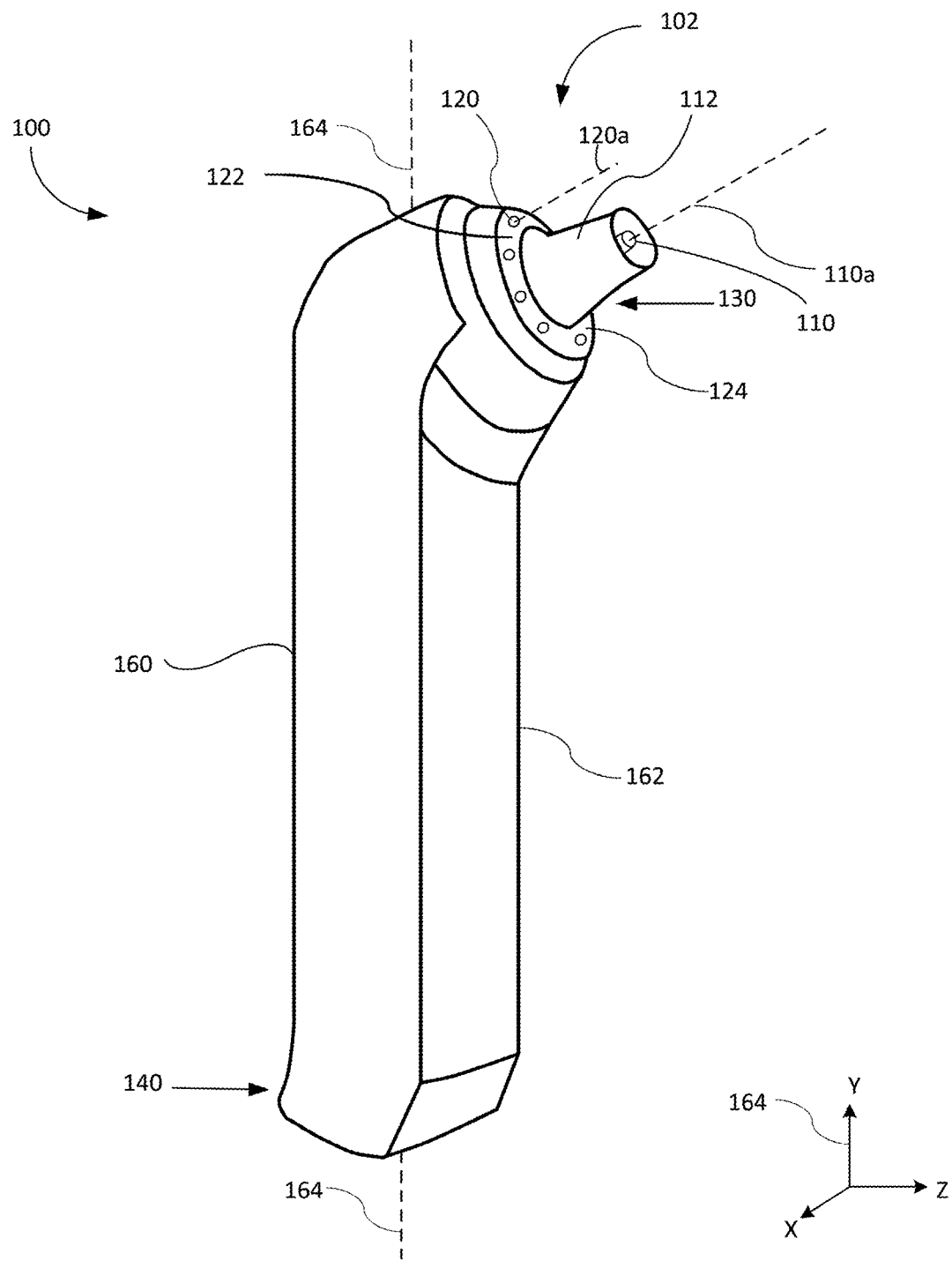
FIG. 1a is a front perspective view of an embodiment of a thermometer in accordance with the present disclosure.
Figure 1B:
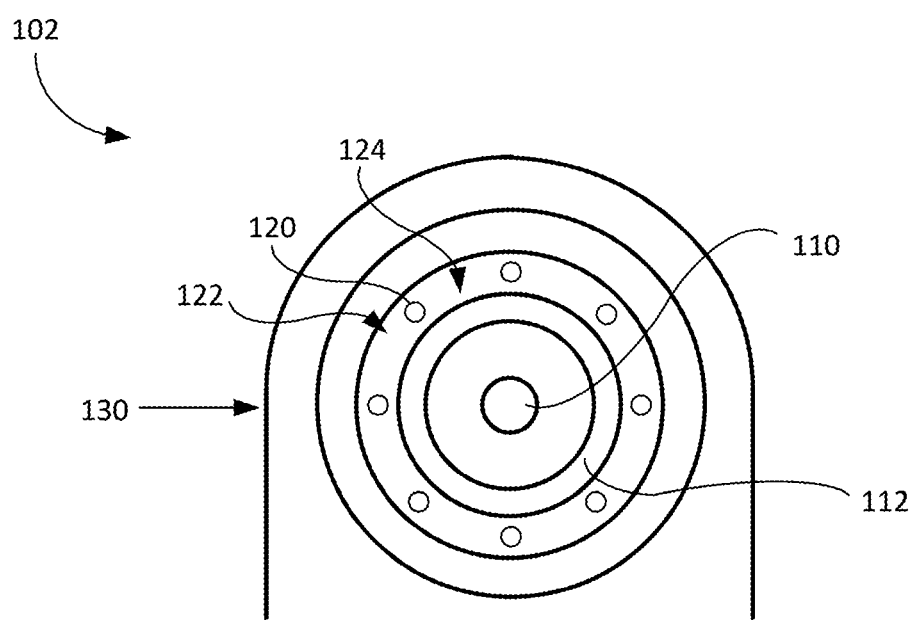

In the following detailed description of illustrative embodiments, reference is made to the accompanying figures of the drawing which form a part hereof, and in which are shown, by way of illustration, specific embodiments which may be practiced. It is to be understood that other embodiments may be utilized and structural changes may be made without departing from (e.g., still falling within) the scope of the disclosure presented hereby.

Exemplary medical instruments such as thermometers and methods regarding such thermometers shall generally be described with reference to FIGS. 1-4. It will be apparent to one skilled in the art that elements from one embodiment may be used in combination with elements of the other embodiments. Further, it will be recognized that the size and shape of various elements herein may be modified without departing from the scope of the present disclosure, although one or more shapes and sizes may be advantageous over others.

FIGS. 1a-1d depict various views of one exemplary embodiment of a thermometer 100 according to the present disclosure. FIGS. 1a-1d illustrate a thermometer 100 that may be used to measure the temperature of a living being at a target measurement location of the living being. Target measurement locations may include an external surface of the living being, or inside a cavity of the living being. Example target measurement locations may include an ear or a forehead of the living being.

Figure 3:
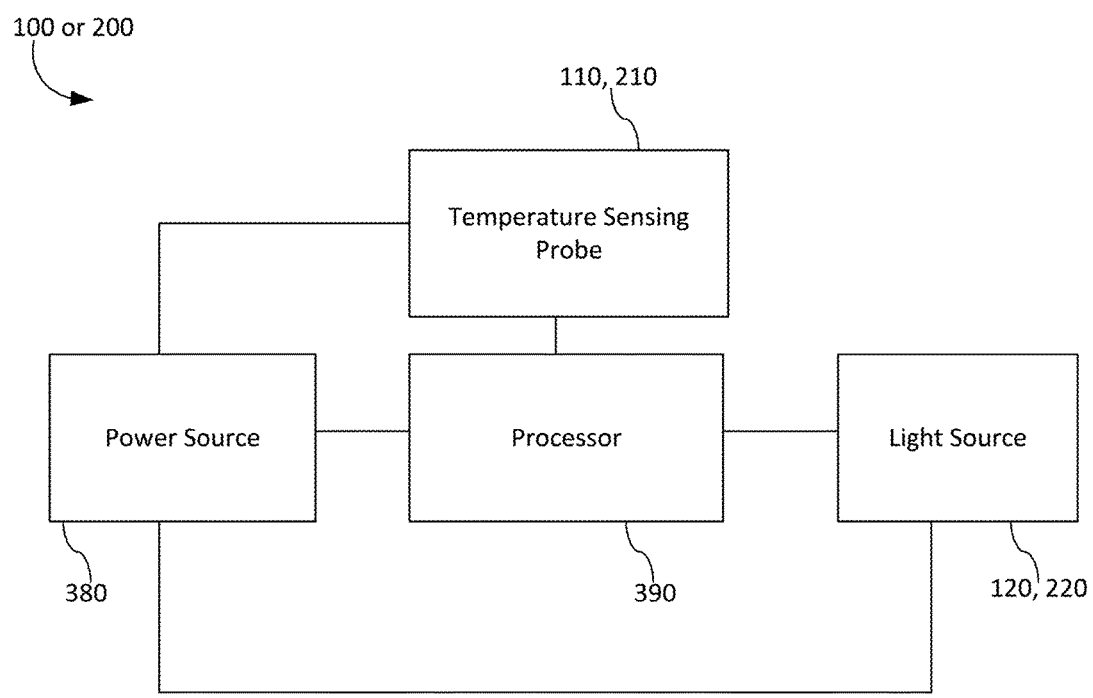
FIG. 3 is a block diagram schematic of the thermometer embodiment of FIGS. 1a-1d and 2a-2c.

FIG. 1a depicts a perspective view of the exemplary thermometer 100 including a housing 160, a temperature sensing probe 110, a processor 390 (FIG. 3) a light source 120, and a power source 380 (FIG. 3). In one or more embodiments of the thermometer 100, the housing 160 may include a body having two end portions including a proximal end portion 130 and a distal end portion 140. The housing 160 may extend along a central or longitudinal axis 164. Generally, the proximal end portion 130 may be located near the probe area 102, near the temperature sensing probe 110, and the distal end portion 140 may be located opposite the temperature sensing probe 110. In some embodiments, a handle portion 162 may be provided to aid the user in grasping and holding the thermometer 100 during use. The handle portion 162 may be located between the proximal end portion 130 and the distal end portion 140, but it is conceived that the handle portion 162 could be provided at any suitable location on the thermometer 100.

One exemplary embodiment of the thermometer 100 includes a temperature sensing probe 110 located at or near the proximal end portion 130. The temperature sensing probe 110 may be configured to measure the temperature of the living being at target measurement locations such as the ear of the living being, or the forehead of the living being. In some embodiments, the temperature sensing probe 110 uses infrared technology to measure temperature. Infrared technology is known in the field of ear and forehead (e.g., temporal) thermometers. The temperature sensing probe 110 may be at least partially surrounded by a guide element 112.

In one or more embodiments a processor 390 (FIG. 3) may be located within housing 160. As shown in the block diagram schematic of FIG. 3, the processor 390 may be operatively coupled to the power source 380, the temperature sensing probe 110, and the light source 120. The processor 390 may be configured to determine the temperature of the living being based on information received from the temperature sensing probe 110 and to illuminate the light source 120 in one of the plurality of colors based on the information acquired by the temperature sensing probe 110 during a temperature measurement. The light source 120 may include a plurality of individual light sources near (e.g., proximate, adjacent) one another.

The light source 120 may be configured to illuminate an illumination portion 122 of the housing 160. The illumination portion 122 may be located closer to the proximal end portion 130 of the housing 160 than the distal end portion 140 of the housing 160. In some embodiments only a portion of the illumination portion 122 is located closer to the proximal end portion 130 than the distal end portion 140. The illumination portion 122, including the most proximal end of the illumination portion 122, may be near (e.g., adjacent, proximate) the temperature sensing probe 110. The light source 120 may be configured to emit light in a plurality of colors. In some embodiments the plurality of colors include a spectrum of colors (e.g., a combination of colors), where each color corresponds to a specific temperature, a temperature range, or a temperature threshold being crossed.

In some embodiments, at least one color of the plurality of colors is indicative of a pre-measurement state. The pre-measurement state may serve to illuminate the target measurement location on the living being, or an area immediately surrounding the target measurement location, to aid in proper placement of the temperature sensing probe 110, even in a dark room. For example, the light source 120 may be configured to provide illumination in at least one color that is not indicative of a temperature, temperature range, or temperature threshold being crossed. In some embodiments, the color indicative of the pre-measurement state may be white.

The pre-measurement state of the light source 120 may occur under a variety of conditions. For example, when turning on the thermometer 100, by initiating temperature measurement, by holding the thermometer in a particular orientation, or by an actuator (not shown) on the thermometer 100 that is configured to illuminate the illumination portion 122 in the pre-measurement state color.

Figure 1C:
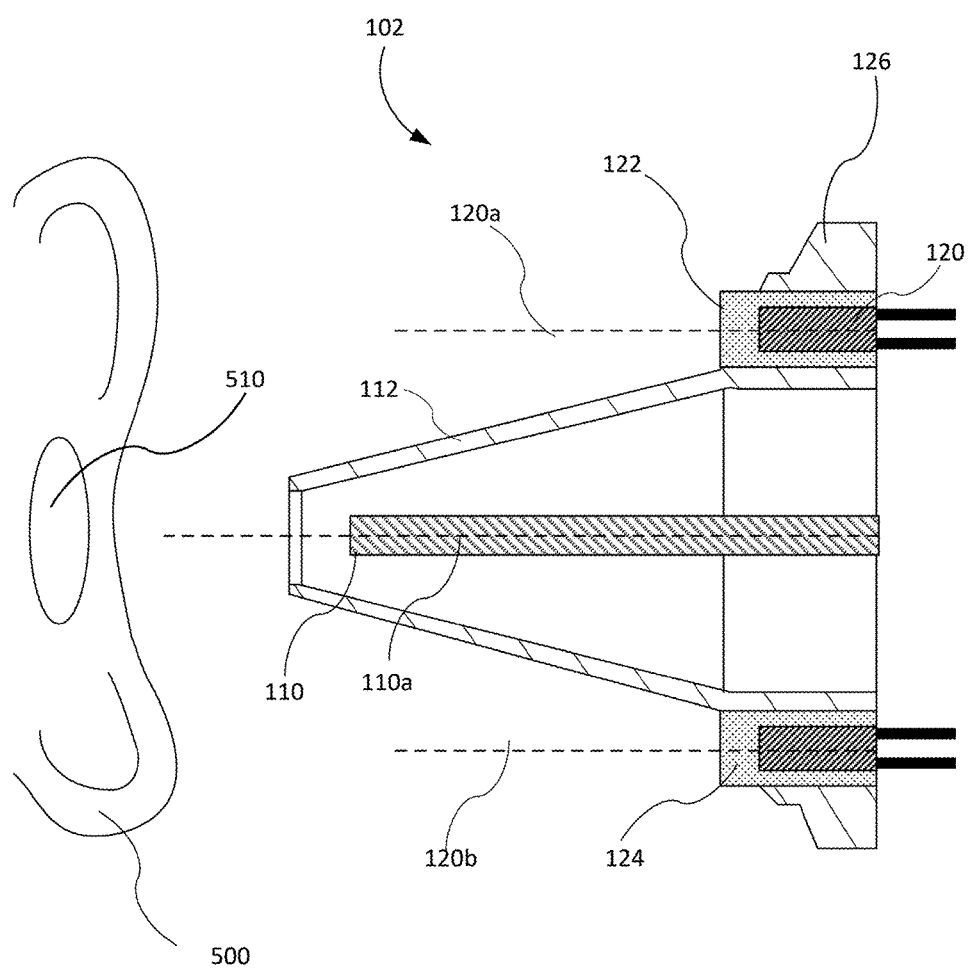
FIG. 1c is a close-up cross section of an embodiment of the probe area of the thermometer shown in FIG. 1a, depicted near an ear of a living being to be measured prior to insertion into the ear canal.

The light source 120 may be positioned and oriented to face an area surrounding the cavity or the external surface of the living being that is being measured during a temperature measurement. For example, the illumination portion 122 faces towards and illuminates the target measurement location of the living being during measurement of the temperature of the living being. This arrangement also allows illumination to be provided to the area surrounding the cavity or the external surface of the living being during placement of the thermometer 100 at the target measurement location, in the measuring orientation, and/or during the temperature measurement, also in the measuring orientation. In one or more embodiments the light source 120 is positioned and oriented to face an area surrounding the cavity or the external surface of the living being such as an ear 500 and/or ear canal 510 (FIG. 1c). In some embodiments, the light source 120 may face a forehead or another part of the living being.

Figure 1D:
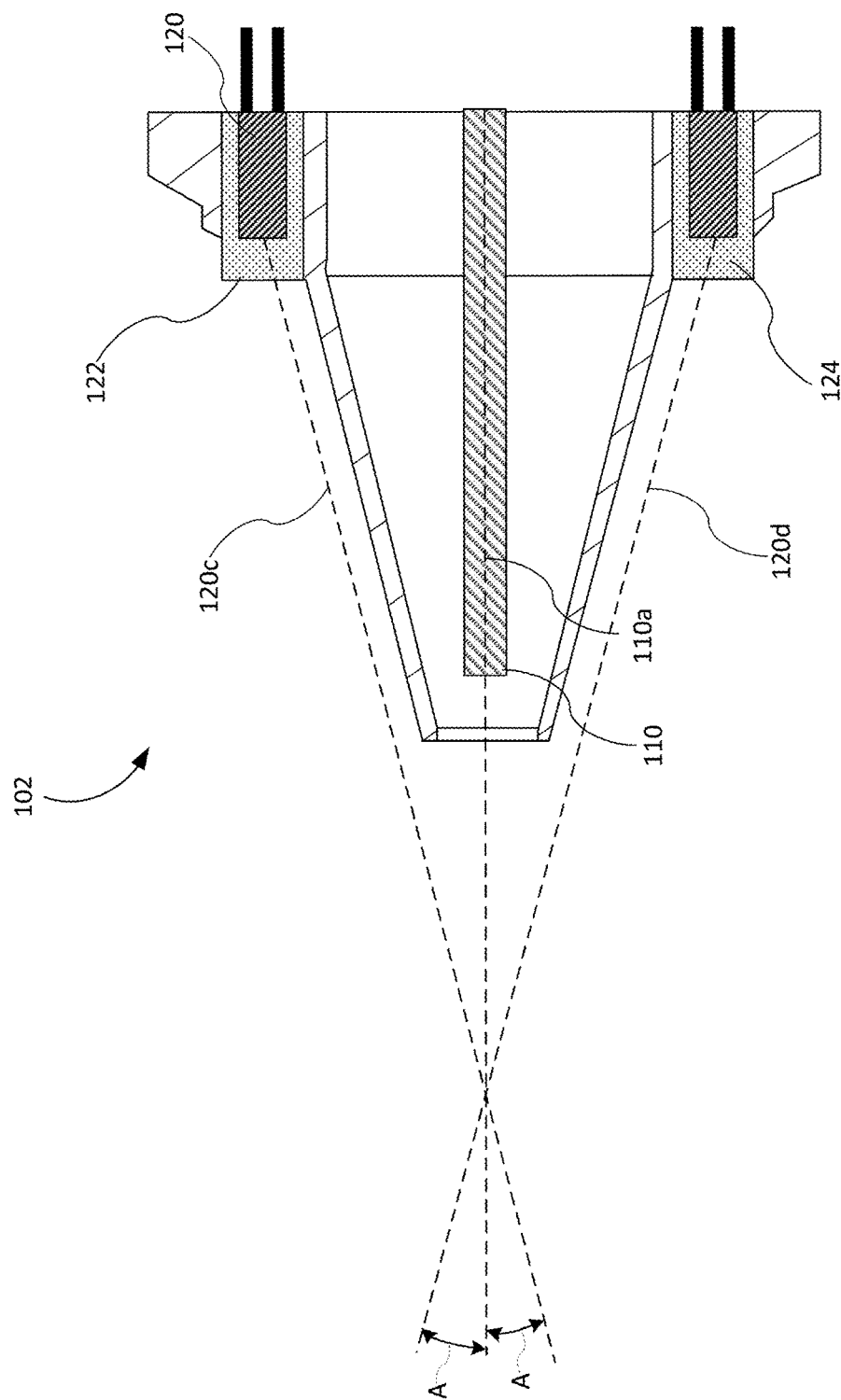

As shown in FIG. 1a, at least one light source axis 120a and the probe axis 110a may extend away from the longitudinal axis 164 of the housing 160. As shown in FIG. 1c, the light source 120 may be located such that light is directed along one or more light source axes 120a, 120b that are parallel or substantially parallel to a probe axis 110a. In some embodiments, as shown in FIG. 1d, one or more of the light source axes 120c, 120d focus light on a point along the probe axis 110a. The light source 120 or the light emitted from the light source 120 may be angled relative to the probe axis 110a, such that the light source axes 120c, 120d intersect the probe axis at an angle A. Examples of suitable angles between the light source axes 120c, 120d and the probe axis 110a may be 3 degrees or more, 5 degrees or more, 10 degrees or more, 15 degrees or more, 20 degrees or more, 30 degrees or more, 35 degrees or more, 40 degrees or more, or 45 degrees or more, 60 degrees or more, 3 degrees or less, 5 degrees or less, 10 degrees or less, 15 degrees or less, 20 degrees or less, 30 degrees or less, 35 degrees or less, 40 degrees or less, or 45 degrees or less or 60 degrees or less. The angle A may be selected based on the specific size, geometry of the components, and the living being for which the device is directed to (child, adults, non-human). Any suitable number of light sources axes 120a, 120b, etc., may be provided.

The light source 120 may illuminate the target measurement location in two or more of the plurality of colors. For example, the light source 120 may illuminate one color in the pre-measurement state, such as white, during placement of the thermometer 100 at or in the ear 510 (FIGS. 1*c*-1*d*). The light source 120 may illuminate the illumination portion 122 in another color upon temperature measurement, the color being indicative of the measured temperature. The plurality of colors may include green, yellow, amber, red, or any other suitable color based on information received from the temperature sensing probe 110 and determined by the processor 390.

The illumination portion 122 of the housing 160 results in the housing 160 (e.g., body) of the thermometer 100 emitting different colors depending on the sensed reading. For example, if the temperature measured is considered to be normal, the light source 120 or illumination portion of the housing 160 may illuminate green, and if the temperature measured is considered to be elevated, or a fever, the light source 120 or illumination portion 122 of the housing may illuminate amber, or red, respectively. The transition between these colors can be through the use of other colors in the spectrum to give the look of color blending. In some embodiments, this effect may be accomplished utilizing multiple multicolored LED's, located close together and by manipulating their state and intensity, as by using the (I2C) Protocol.

The housing 160, including illumination portion 122, may be illuminated via the light source 120 in a variety of arrangements. In some embodiments, the light source 120 includes one or more light emitting diodes (LEDs), but any suitable lighting element such as lamp(s) or fiber optics that can be incorporated or molded into the housing 160 may be used. In some embodiments, the light source 120 may be included in a silicone band or sealing element 124 that is incorporated into the housing 160. As shown in FIGS. 1*a*-1*d*, the illumination portion 122 may include a sealing element 124 formed of a material such as silicone. In one or more embodiments, the illumination portion 122 may include the one or more light emitting diodes embedded in the silicone.

By embedding LEDs in silicone, either by proximity or through overmodling, the deviation of Snell's law of reflection may be employed. The deviation of Snell's law of reflection, referred to as diffuse reflection, occurs when photons of light are reflected off an obstructing surface and they scatter. The obstruction has the ability to diffuse the light as well as have an internal crystal structure that internally scatters the light. In the case of a clear or opaque silicone, the end result is that the whole body of the silicone material glows. This arrangement of the light source 120 and illumination portion 122 of housing 160 provide a combination of benefits. The arrangement provides illumination during placement of the temperature sensing probe 110 (e.g., pre-measurement state), and an indication of the temperature of the living being during measurement. Both of these benefits are accomplished without the need to remove the thermometer 100 from the target measurement location to discern the results.

The power source 380 provides power to each of the processor 390, the light source 120 and the temperature sensing probe 110. The power source 380 may include any suitable form of power, whether by alternating current (AC) or direct current (DC) (via batteries). Power generation features, such as solar cells and other alternative energy forms may be included.

Figure 2B:
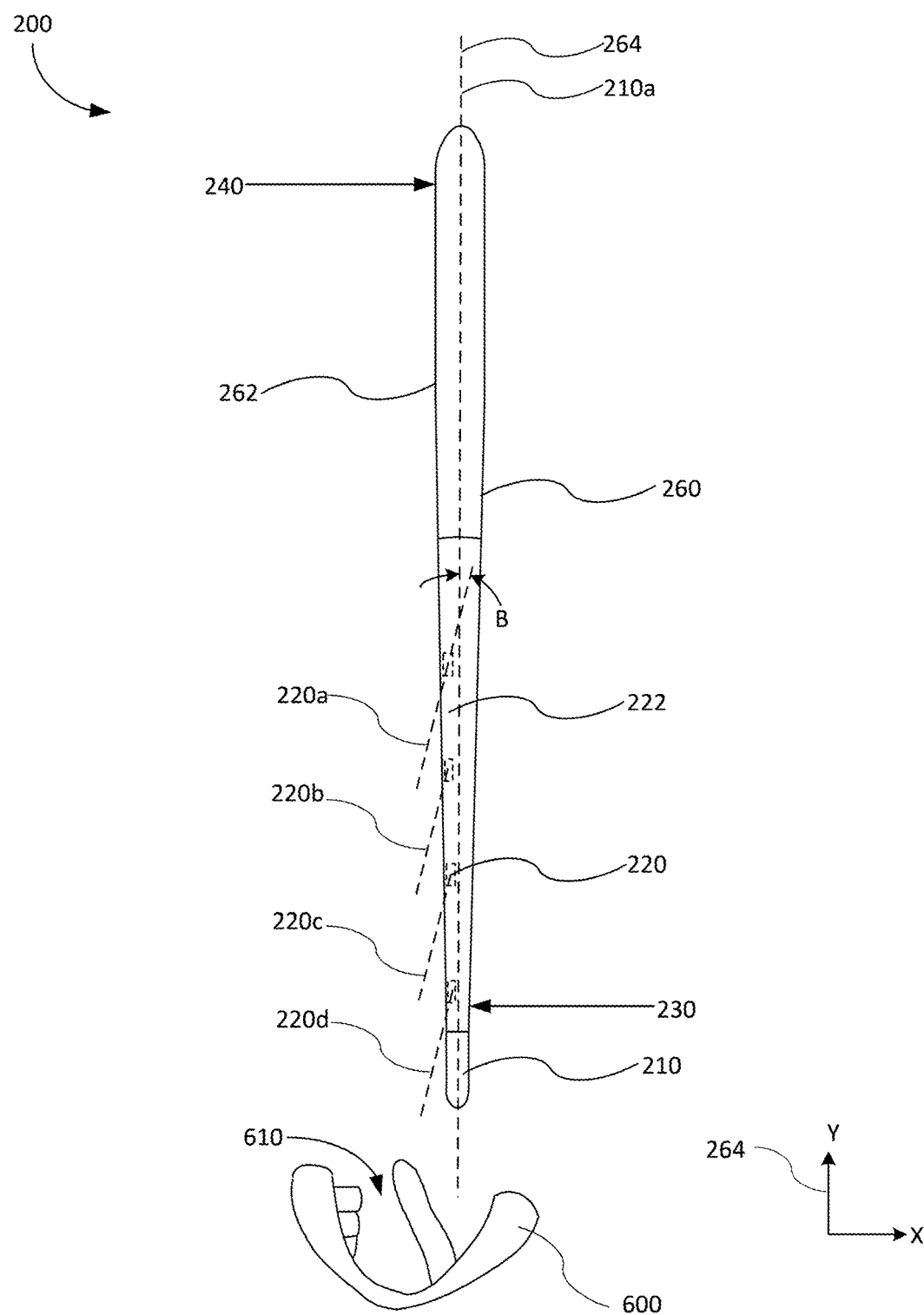
FIG. 2b is a side view of the thermometer of FIG. 2a proximate the mouth of the living being.
Figure 2C:
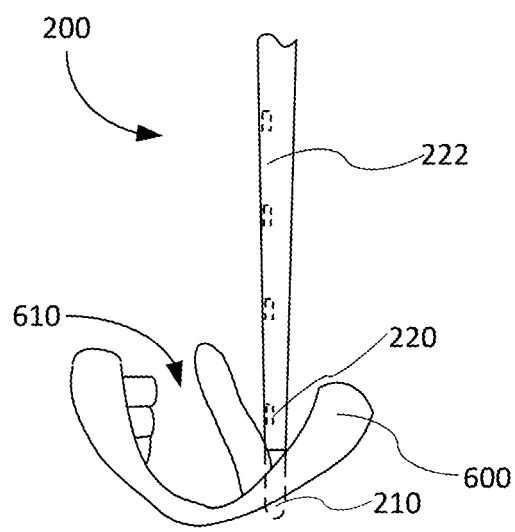
FIG. 2c is a close-up side view of a portion of the thermometer of FIG. 2a placed in the mouth of the living being.

FIGS. 2*a*-2*c* depict a second illustrative embodiment of a thermometer 200 according to the present disclosure. The thermometer 100 of FIGS. 1*a*-1*d* and the thermometer 200 of FIGS. 2*a*-2*c* are similar in many respects. Therefore, like numerals of the thermometer 200 correspond to like numerals of the thermometer 100. The thermometers 100, 200 function substantially similar with respect to the processor 390, the power source 380 and the rules by which the processor 390 determines the temperature, and illuminates the light source 120 and illumination portion 122 in a plurality of colors. Therefore, such features, including the processor 390, the power source 380 (turned on via power button 282), and the overall process for determining what color(s) is provided by the light source 220 of thermometer 200 will not be described in full detail.

In brief, as described with reference to the thermometer 100, thermometer 200 includes the power source 380 (FIG. 3) operatively connected to the processor 390 (FIG. 3), the temperature sensing probe 210, and light source 220. The processor 390 may illuminate the light source 120, 220 in a color indicative of a pre-measurement state (e.g., white). For example, information (e.g., data) generated at the temperature sensing probe 210 is analyzed by the processor 390 according to a pre-determined set of rules. The light source 220 is then illuminated in a particular color indicative of the temperature of the living, based on the processed information.

One difference between the thermometer 100 of FIGS. 1*a*-1*d* and the thermometer 200 of FIGS. 2*a*-2*c*, relates to the location, geometric relationship, and arrangement of components with regard to housing 260, as compared to their location on housing 160. In particular, the differences between the thermometer 200 over the thermometer 100 may include the location, arrangement and geometric relationship between the light source 220, the illumination portion 222, and the temperature sensing probe 210, with respect to the housing 260.

Another difference between the two thermometers 100, 200 is that thermometer 100 may be used for temperature measurement at the ear or forehead of the living being, while the thermometer 200 may be used for measurement in the oral cavity 610, armpit or rectum of the living being. Suitable target measurement locations for using thermometer 200 may include an external surface of the living being, or inside a cavity of the living being. In some embodiments, the cavity may include an openable and closeable cavity of the living being, such as the mouth 600 (FIGS. 2*a*-2*c*) or oral cavity 610 (FIGS. 2*a*-2*c*) of the living being.

In the exemplary embodiment of FIGS. 2*a*-2*c*, the light source 220 may be configured to illuminate an illumination portion 222 of the housing 260. The illumination portion 222 may be located closer to the proximal end portion 230 of the housing 260 than the distal end portion 240 of the housing 260. The illumination portion 222 and or the light source 220 may be located near the temperature sensing probe 210. The light source 220 may be configured to emit light in a plurality of colors (e.g., a spectrum of colors, a combination of colors, as previously described with respect to the embodiment of FIGS. 1*a*-1*d*).

As shown in FIG. 2*a*, and further depicted in 2*b*, the illumination portion 222 may face towards and illuminates the target measurement location on the living being during measurement of the temperature of the living being. For example, when the thermometer 200 is placed in the open mouth 600 of the living being, the illumination portion 222 is arranged such that it illuminates the oral cavity 610. When the oral cavity 610 is open and the thermometer 200 is being inserted, this arrangement aids in correct placement of the temperature sensing probe 210.

The light source 220 and illumination portion 222 may be configured such that the position and orientation of the illumination portion 222 illuminates the living being both inside and outside the cavity of the living being during measurement. Such illumination may occur even when the mouth 600 of the living being is closed around the proximal end portion 160 of the housing 260, and the thermometer 200 is held stationary during a temperature measurement. The light source 220 and illumination portion 222 may provide illumination under these conditions in a single color, or in two or more of the plurality of colors. In other words, the light source 220 and illumination portion 222 of the thermometer 200 may be capable of, or configured to, illuminate an open mouth 600 during placement of the thermometer 200 in the mouth 600 of the living being (e.g., tongue, teeth, gums).

The thermometer 200 may be capable of providing illumination that extends from an area near the temperature sensing probe 210, along a longitudinal axis 264 of the housing 260 (e.g., body) of the thermometer 200. The light source 220 and/or the illumination portion 222 may be located (e.g., distributed, spaced apart, grouped) along the longitudinal axis 264 and direct light in a direction outward from, or away from, the longitudinal axis 264 and/or probe axis 210a. However, in some embodiments, at least a portion of the light may be directed along the longitudinal axis 264 and/or probe axis 210a. As shown in FIG. 2b, the light source 220 may be located such that light is directed along one or more light source axes 220a-d. In some embodiments, light emitted from the light source 220 may be angled relative to the probe axis 110a, such that the light source axes 220a-d intersect the probe axis at an angle B. Examples of suitable angles between the light source axes 220a-d and the probe axis 110a may be 3 degrees or more, 5 degrees or more, 10 degrees or more, 15 degrees or more, 20 degrees or more, 30 degrees or more, 35 degrees or more, 40 degrees or more, or 45 degrees or more, 60 degrees or more, 3 degrees or less, 5 degrees or less, 10 degrees or less, 15 degrees or less, 20 degrees or less, 30 degrees or less, 35 degrees or less, 40 degrees or less, or 45 degrees or less or 60 degrees or less. The angle B may be selected based on the specific size, geometry of the components, and the living being for which the device is directed to (child, adults, non-human). Any suitable number of light source axes may be provided. The angle B may include the same or different angle B for each light source axis in order to direct the light or arrange components as desired. The light source axes 220a-d may intersect the probe axis 210a and/or the longitudinal axis 264 at other angles, including a perpendicular, or substantially perpendicular arrangement.

FIG. 2c depicts the thermometer 200 placed in the mouth 600 of the living being just prior to the mouth 600 being closed around the temperature sensing probe 210 and the proximal end portion 230 of the housing. As can be gleaned from FIG. 2c, when the thermometer 200 is placed in the mouth 600 of the living being and the mouth 600 of the living being is closed around the proximal end portion 230 of the housing 260, the proximal end portion 230 of the housing 260 may reside inside the mouth 600 of the living being. The portion of the illumination portion 222 residing inside the mouth 600 may include a portion of the illumination portion 222 nearest the temperature sensing probe 210. In addition, the portion of the illumination portion 222 distal from the temperature sensing probe 210 may reside outside the mouth 600 or oral cavity 610 of the living being, and may illuminate a portion of the face of the user (e.g., outer lips, nose, chin). In other words, prior to measurement, the thermometer 200 may illuminate the oral cavity 610 of the open mouth 600 to facilitate proper placement of the temperature sensing probe 210 (e.g., under the tongue 620). Such illumination may be in a pre-measurement state color, such as white. Further, during measurement, when the mouth 600 is closed, both a portion of the internal oral cavity 610 and an external portion of the mouth 600 may be illuminated by the illumination portion 222. Upon temperature measurement, both the oral cavity 610 and the mouth 600 may be illuminated in at least one other color of the plurality of colors.

The temperature sensing probe 210 may be defined along a probe axis 210a that may be coincident, co-axial or parallel to the longitudinal axis 264 of the housing 260. The temperature sensing probe 210 may alternatively be located at an angle extending away from the longitudinal axis 264, or intersecting the longitudinal axis 264 (e.g., 5 degrees or more, 10 degrees or more, 15 degrees or more, 20 degrees or more, 30 degrees or more, or 45 degrees or more, or 5 degrees or less, 10 degrees or less, 15 degrees or less, 20 degrees or less, 30 degrees or less, or 45 degrees or less), for ergonomic placement of the temperature sensing probe 210. The particular angle may be based on the specific size, geometry of the components, and the living being for which the device is directed to (child, adults, non-human).

FIG. 4 is a flow chart illustrating an example of a method 400 of operation of a thermometer (such as shown in FIGS. 1a-d and FIGS. 2a-2c). For example, the method 400 for measuring a temperature of a living being inside a cavity or on an external surface of the living being may include providing thermometer (Step 410). The thermometer may include a temperature sensing probe and a housing coupled to the temperature sensing probe. The housing may have a proximal end portion near the temperature sensing probe, and a distal end portion, opposite the temperature sensing probe.

The thermometer may further include electrical components operatively coupled to one another. Such electrical components may include a power source, a light source, and a processor. The light source and a corresponding illumination portion that is illuminated by the light source, may be located closer to the proximal end portion of the housing than the distal end portion of the housing, and near the temperature sensing probe. The processor operatively couples the temperature sensing probe, the power source, and the light source.

Steps of the method may further include illuminating the illumination portion in at least one color of a plurality of colors, with the at least one color being indicative of the pre-measurement state (Step 420). In some embodiments, the color indicative of the pre-measurement state is white. Inserting the temperature sensing probe into the cavity of the living being or applying the temperature sensing probe to the external surface of the living being (Step 430). Initiating measurement of the temperature of a living being using the temperature sensing probe (Step 440). Processing information received from the temperature sensing probe with the processor to determine the temperature of the living being (Step 450). Selecting an illumination color from a spectrum of colors indicative of temperature ranges (Step 455), and illuminating the illumination portion in at least one color of the plurality of colors that is indicative of the determined temperature (Step 460). In some embodiments, Steps 455 and 460 of the method includes illuminating the illumination portion in at least one color of the plurality of colors indicative of a specific temperature range (Step 460), wherein the plurality of colors includes a spectrum of colors indicative of specific temperature ranges.

Various examples have been described. These and other examples are within the scope of the following claims. These and other variations, combinations, and modification in the invention will be apparent to those skilled in the art without departing from the scope of the invention, and it should be understood that this invention is not limited to the illustrative embodiments set forth herein. As features of one embodiment may be interchanged with features of another embodiment, the dependency of the following claims may also be interchanged, without departing from the scope of the invention.

The invention claimed is:

1. A thermometer for measuring a temperature of a living being inside a cavity or on an external surface of the living being, comprising:
   a temperature sensing probe;
   a housing coupled to the temperature sensing probe comprising:
      a proximal end portion, wherein the temperature sensing probe is at the proximal end portion;
      a distal end portion opposite the temperature sensing probe;
      a power source;
      a light source configured to illuminate an illumination portion of the housing, the illumination portion located closer to the proximal end portion of the housing than the distal end portion of the housing, wherein the light source is configured to emit light in each of a plurality of colors, wherein each color of a subset of colors of the plurality of colors is indicative of a specific temperature range, wherein a first color of the plurality of colors is indicative of a pre-measurement state, wherein the first color is not included in the subset of colors, wherein the light source is positioned to further illuminate a target location of an object to be measured by the temperature sensing probe, wherein the light source is configured to emit the light such that the light changes from the first color to a second color of the plurality of colors, the second color belonging to the subset of colors and being indicative of a temperature range that includes the temperature measured by the temperature sensing probe; and
      an obstructing surface over the light source, wherein the obstructing surface is configured to diffuse the light emitted by the light source such that the light source evenly illuminates the target location of the object; and
   a processor operatively coupled to the power source, the temperature sensing probe, and the light source, wherein the processor is configured to determine the temperature of the living being based on information received from the temperature sensing probe and to illuminate the light source in one of the plurality of colors based on the information from the temperature sensing probe.

2. The thermometer of claim 1, wherein the first color indicative of the pre-measurement state is white.

3. The thermometer of claim 1, wherein the plurality of colors includes a spectrum of colors indicative of temperature ranges.

4. The thermometer of claim 1, wherein the light source comprises one or more light emitting diodes embedded in silicone.

5. The thermometer of claim 1, wherein the obstructing surface comprises a sealing element.

6. The thermometer of claim 5, wherein the sealing element comprises silicone.

7. The thermometer of claim 1, wherein the light source is positioned to face and illuminate a cavity or external surface of the living being during a temperature measurement with at least one of the subset of colors.

8. The thermometer of claim 1, wherein the light source is positioned and oriented to (i) face an area surrounding the cavity or the external surface of the living being during a temperature measurement and (ii) provide illumination to the area surrounding the cavity or the external surface of the living being in two or more of the subset of colors during the temperature measurement.

9. The thermometer of claim 8, wherein the cavity or the external surface of the living being is an ear or forehead of the living being.

10. The thermometer of claim 8, wherein the cavity or the external surface of the living being is an oral or rectal cavity of the living being.

11. The thermometer of claim 1, wherein the light source is positioned and oriented to illuminate the living being both inside and outside the cavity of the living being when held stationary during a temperature measurement.

12. The thermometer of claim 1, wherein the light source is positioned and oriented to illuminate the living being both inside and outside the cavity of the living being when held stationary during a temperature measurement, in two or more of the subset of colors.

13. A thermometer for measuring a temperature of a living being at a target measurement location of the living being, comprising:
   a temperature sensing probe;
   a housing coupled to the temperature sensing probe comprising:
      a proximal end portion, wherein the temperature sensing probe is at the proximal end portion;
      a distal end portion opposite the temperature sensing probe;
      a power source;
      a light source configured to illuminate an illumination portion of the housing, the illumination portion located closer to the proximal end portion of the housing than the distal end portion of the housing, wherein the light source is configured to emit light in each of a plurality of colors, wherein each color of a subset of colors of the plurality of colors is indicative of a specific temperature range, wherein the illumination portion faces towards and illuminates the target measurement location on the living being during measurement of the temperature of the living being, and wherein the light source is configured to emit the light such that the light changes from a first color of the subset of colors to a second color of the plurality of colors, the second color being indicative of a temperature range that includes the temperature measured by the temperature sensing probe; and
      an obstructing surface over the light source, wherein the obstructing surface is configured to diffuse the light emitted by the light source such that the light source evenly illuminates the target location of the object; and
   a processor operatively coupled to the power source, the temperature sensing probe, and the light source, wherein the processor is configured to determine the temperature of the living being based on information received from the temperature sensing probe and to illuminate the light source in one of the plurality of colors based on the information from the temperature sensing probe.

14. The thermometer of claim 13, wherein at least one color of the plurality of colors is indicative of a pre-measurement state.

15. The thermometer of claim 14, wherein the at least one color is white.

16. The thermometer of claim 13, wherein the light source is positioned to face and illuminate a cavity or external surface of the living being during a temperature measurement with at least one of the subset of colors.

17. The thermometer of claim 13, wherein the light source is positioned and oriented to (i) face an area surrounding the cavity or the external surface of the living being during a temperature measurement and (ii) provide illumination to the area surrounding the cavity or the external surface of the living being in two or more of the subset of colors during the temperature measurement.

18. The thermometer of claim 17, wherein the target measurement location on the living being is an ear or forehead of the living being.

19. The thermometer of claim 17, wherein the light source comprises one or more light emitting diodes embedded in silicone.

20. A thermometer for measuring a temperature of a living being at an openable and closeable cavity of a living being, comprising:
   a temperature sensing probe;
   a housing coupled to the temperature sensing probe comprising:
      a proximal end portion, wherein the temperature sensing probe is at the proximal end portion;
      a distal end portion opposite the temperature sensing probe;
      a power source; and
      a light source configured to illuminate an illumination portion of the housing, the illumination portion located closer to the proximal end portion of the housing than the distal end portion of the housing, wherein the light source is configured to emit light in each of a plurality of colors, wherein each color of a subset of colors of the plurality of colors is indicative of a specific temperature range, wherein a first color of the plurality of colors is indicative of a pre-measurement state, wherein the first color is not included in the subset of colors, wherein during a temperature measurement when the proximal end portion of the housing is placed in the cavity of the living being, the cavity is at least partially illuminated by the illumination portion both when the cavity is open and when the cavity is closed around the proximal end portion of the housing during the temperature measurement, wherein the light source is configured to emit the light such that the light changes from the first color to a second color of the plurality of colors, the second color belonging to the subset of colors and being indicative of a temperature range that includes the temperature measured by the temperature sensing probe; and
   a processor operatively coupled to the power source, the temperature sensing probe, and the light source, wherein the processor is configured to determine the temperature of the living being based on information received from the temperature sensing probe and to illuminate the light source in one of the plurality of colors based on the information from the temperature sensing probe.

21. The thermometer of claim 20, wherein the first color indicative of the pre-measurement state is white.

22. The thermometer of claim 20, wherein the cavity of the living being is an oral or rectal cavity of the living being.

23. The thermometer of claim 20, wherein the light source is positioned to face and illuminate a cavity or external surface of the living being during a temperature measurement with at least one of the plurality of colors.

24. The thermometer of claim 20, wherein the light source is positioned and oriented to illuminate the living being both the inside and outside the cavity of the living being when held stationary during the temperature measurement.

25. The thermometer of claim 20, wherein the light source is positioned and oriented to illuminate the living being both inside and outside the cavity of the living being when held stationary during the temperature measurement, in two or more of the plurality of colors.

26. A method for measuring a temperature of a living being inside a cavity or on an external surface of the living being, comprising:
   providing a thermometer comprising:
      a temperature sensing probe;
      a housing coupled to the temperature sensing probe comprising:
         a proximal end portion, wherein the temperature sensing probe is at the proximal end portion;
         a distal end portion opposite the temperature sensing probe;
         a power source;
         a light source configured to emit light in each of a plurality of colors, wherein each color of a subset of colors of the plurality of colors is indicative of a specific temperature range, the light source and an illumination portion located closer to the proximal end portion of the housing than the distal end portion of the housing and near the temperature sensing probe, wherein the light source is positioned to further illuminate a target location of an object to be measured by the temperature sensing probe;
         an obstructing surface over the light source; and
      a processor operatively coupling the temperature sensing probe, the power source, and the light source;
   emitting light from the light source in a first color of the plurality of colors, the first color being indicative of a pre-measurement state, wherein the first color is not included in the subset of colors, wherein the obstructing surface diffuses the light emitted by the light source such that the light source evenly illuminates the target location of the object;
   initiating measurement of the temperature of a living being using the temperature sensing probe;
   processing information received from the temperature sensing probe with the processor to determine the temperature of the living being;
   changing the light from the light source from the first color to a second color, the second color belonging to the subset of colors and being indicative of a temperature range that includes the temperature measured by the temperature sensing probe.

27. The method of claim 26, wherein the first color is white.

28. The method of claim 26, further comprising selecting the second color from a spectrum of colors indicative of temperature ranges before illuminating the illumination portion in the second color.

29. The method of claim 26, wherein the light source is positioned to face and illuminate a cavity or external surface of the living being during a temperature measurement.

* * * * *